United States Patent
Li et al.

(10) Patent No.: US 11,068,853 B2
(45) Date of Patent: Jul. 20, 2021

(54) PROVIDING CALENDAR UTILITY TO CAPTURE CALENDAR EVENT

(71) Applicant: MICROSOFT TECHNOLOGY LICENSING, LLC, Redmond, WA (US)

(72) Inventors: Joan Li, Bellevue, WA (US); Vadim Varfolomeyev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 645 days.

(21) Appl. No.: 14/979,606

(22) Filed: Dec. 28, 2015

(65) Prior Publication Data
US 2017/0185966 A1    Jun. 29, 2017

(51) Int. Cl.
*G06Q 10/10*    (2012.01)
*G06F 3/0482*   (2013.01)
*H04L 29/08*    (2006.01)

(52) U.S. Cl.
CPC ....... *G06Q 10/1095* (2013.01); *G06F 3/0482* (2013.01); *H04L 67/18* (2013.01)

(58) Field of Classification Search
CPC .... G06F 3/0482; G06F 3/04847; G06F 9/451; G06F 17/30864; G06F 3/0484; G06Q 10/1095; G06Q 10/109; G06Q 50/01; G06Q 10/06311; G06Q 10/06314; H04L 51/24; H04L 67/18; H04L 67/22; H04L 51/32; H04L 12/1881; H04L 67/32
USPC .............. 40/109; 705/7.18, 7.19, 7.15, 7.16; 715/744; 706/7.18, 7.19, 7.15, 7.16
See application file for complete search history.

(56) References Cited

U.S. PATENT DOCUMENTS

| | | | | |
|---|---|---|---|---|
| 5,070,470 A | * | 12/1991 | Scully | .................. G06Q 10/109 708/112 |
| 5,999,938 A | * | 12/1999 | Bliss | ......................... G06F 9/44 |
| 6,011,555 A | | 1/2000 | Eckhoff et al. | |
| 7,251,786 B2 | * | 7/2007 | Wynn | .................... G06F 17/241 715/255 |
| 7,278,111 B2 | | 10/2007 | Stata et al. | |
| 7,487,458 B2 | | 2/2009 | Jalon et al. | |
| 7,865,387 B2 | * | 1/2011 | Mansour | ........... G06Q 10/06311 705/7.16 |

(Continued)

OTHER PUBLICATIONS

"Calendar", Retrieved on: Oct. 21, 2015 Available at: http://help.smartertools.com/SmarterMail/v14/GeneratePDF.ashx?treeid=69.

(Continued)

*Primary Examiner* — Pan G Choy
(74) *Attorney, Agent, or Firm* — Michael Best & Friedrich LLP (57) ABSTRACT

A calendar utility is provided to capture a calendar event. A communication application initiates operations to capture the calendar event by monitoring a communication or a document. A calendar utility is generated after a calendar information such as a date, a time, a location, a title, and/or a subject associated with an event is parsed from the communication or document. The calendar utility is generated with a title element and a calendar list to provide for a selection of a calendar. The calendar utility is displayed, in relation to the calendar information, to capture a calendar event associated with the communication or the document. The calendar event is captured based on entry(s) and/or selection(s) on the calendar utility.

19 Claims, 7 Drawing Sheets

(56) References Cited

U.S. PATENT DOCUMENTS

| | | | | |
|---|---|---|---|---|
| 7,991,636 | B1* | 8/2011 | Groves | G06Q 10/109 |
| | | | | 705/7.18 |
| 8,219,920 | B2 | 7/2012 | Langoulant et al. | |
| 8,838,461 | B2 | 9/2014 | Beebe et al. | |
| 2004/0044674 | A1* | 3/2004 | Mohammadioun | G06Q 10/10 |
| 2005/0034079 | A1* | 2/2005 | Gunasekar | G06Q 10/10 |
| | | | | 715/753 |
| 2007/0130275 | A1* | 6/2007 | Maresh | G06Q 10/10 |
| | | | | 709/207 |
| 2008/0034047 | A1* | 2/2008 | Rosenberg | G06Q 10/109 |
| | | | | 709/206 |
| 2008/0256429 | A1* | 10/2008 | Penner | G06F 40/186 |
| | | | | 715/200 |
| 2009/0172589 | A1* | 7/2009 | Brown | G06F 3/04845 |
| | | | | 715/787 |
| 2009/0255153 | A1* | 10/2009 | Mori | G09D 3/12 |
| | | | | 40/107 |
| 2010/0070877 | A1* | 3/2010 | Scott | G06Q 10/109 |
| | | | | 715/751 |
| 2010/0088143 | A1* | 4/2010 | Platt | G06Q 10/063116 |
| | | | | 705/7.18 |
| 2010/0159967 | A1* | 6/2010 | Pounds | H04L 51/14 |
| | | | | 455/466 |
| 2014/0157177 | A1* | 6/2014 | Ghadge | G06Q 10/109 |
| | | | | 715/772 |
| 2014/0288990 | A1* | 9/2014 | Moore | G06Q 10/107 |
| | | | | 705/7.19 |
| 2014/0310044 | A1* | 10/2014 | Meltzer | G06Q 10/1095 |
| | | | | 705/7.19 |
| 2015/0006524 | A1 | 1/2015 | Jose et al. | |
| 2015/0058056 | A1* | 2/2015 | Comerford | G06Q 10/1095 |
| | | | | 705/7.19 |
| 2015/0058057 | A1* | 2/2015 | Egan | G06Q 10/1095 |
| | | | | 705/7.19 |
| 2015/0067044 | A1* | 3/2015 | Bakaev | H04L 65/1059 |
| | | | | 709/204 |
| 2015/0081826 | A1* | 3/2015 | Borna | H04L 51/08 |
| | | | | 709/206 |
| 2015/0193722 | A1* | 7/2015 | Seaman | G06Q 10/109 |
| | | | | 705/7.15 |
| 2018/0167400 | A1* | 6/2018 | Vas | H04L 51/08 |

OTHER PUBLICATIONS

"Transfer Calendars or Events", Published on: Sep. 21, 2015 Available at: https://support.google.com/calendar/answer/78739?hl=en.

"Calendar in Outlook Web App", Retrieved on: Oct. 21, 2015 Available at: https://support.office.com/en-us/article/Calendar-in-Outlook-Web-App-5219c457-d1fe-4c2f-9032-1a816b88e936?ui=en-US&rs=en-US&ad=US.

"Calendar Event for Multiple Calendars", Published on: Apr. 16, 2013 Available at: http://forums.imore.com/iphone-4/209807-calendar-event-multiple-calendars.html.

"Drop-down Lists & Combo Boxes", Published on: Jun. 12, 2014 Available at: https://msdn.microsoft.com/en-us/library/windows/desktop/dn742404(v=vs.85).aspx.

"A Date-Time Picker Control. Convert a Text Box in a Datetime Picker", Published on: Apr. 17, 2011 Available at: http://www.ajaxshake.com/en/JS/22531/a-date-time-picker-control-convert-a-text-box-in-a-datetime-picker-date-time-picker.html.

"OpenWindows User's Guide", Retrieved on: Oct. 21, 2015 Available at: http://docs.oracle.com/cd/E19455-01/806-2901/calendarmanager-90/index.html.

"Displaying a Calendar on a Form Text Field (Pro only)", Published on: Sep. 22, 2011 Available at: http://www.softpress.com/kb/questions/284/Displaying+a+Calendar+on+a+Form+Text+Field+%28Pro+only%29.

Cawley, Christian, "5 Must Know Tips for Managing Your Windows Phone 8.1 Calendar", Published on: Jul. 1, 2014 Available at: http://www.makeuseof.com/tag/5-tips-managing-windows-phone-8-1-calendar/.

"Managing Your Calendar", Retrieved on: Oct. 21, 2015 Available at: http://ptgmedia.pearsoncmg.com/images/0789730081/samplechapter/CH07_0789730081.pdf.

"Split Testing between Standard Search Box and Drop-Down Search Increased Leads by 57.25%", Published on: Sep. 22, 2014 Available at: https://vwo.com/blog/split-testing-standard-search-box-drop-down-search-increased-leads/.

Chau, et al., "What to Do When Search Fails: Finding Information by Association", In Proceedings of SIGCHI Conference on Human Factors in Computing Systems, Apr. 5, 2008, pp. 999-1008.

* cited by examiner

PROVIDING CALENDAR UTILITY TO CAPTURE CALENDAR EVENT

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications facilitate event management.

Vast number of received events and tasks complicate discovery and management of daily events. Indeed, updates, changes, and/or additions to schedules cause difficulties in upkeep of events maintained by an individual. While maintaining events, an additional layer of complication faced by an individual includes multiple calendars associated with an account of the individual. Complications with multiple calendars and vast number of events may lead to mismanagement of events.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a calendar utility provided to capture a calendar event. In some examples, a communication application may monitor a communication for a calendar information. In response to a detection of the calendar information in the communication, a calendar utility may be generated. The calendar utility may include a title element and a calendar list. Next, the calendar utility may be presented to capture the calendar event associated with the communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a communication application provides a calendar utility to capture a calendar event. The communication application may include an email processing application, a document processing application, a messaging application, and/or a conferencing application, among others. In an example scenario, the communication application may monitor a communication or a document for a calendar information. The communication or the document may be parsed to detect the calendar information which may include a date, a time, a location, and/or a title, among others.

A calendar utility may be generated in response to the detected calendar information. The calendar utility may include a title element, a calendar list, a date and time element, and/or a location element to capture a title entry, a date and time entry, a location entry, and/or a selection of a calendar, among others. Next, the calendar utility may be displayed to capture the calendar event associated with the communication or the document.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a calendar utility to capture a calendar event. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
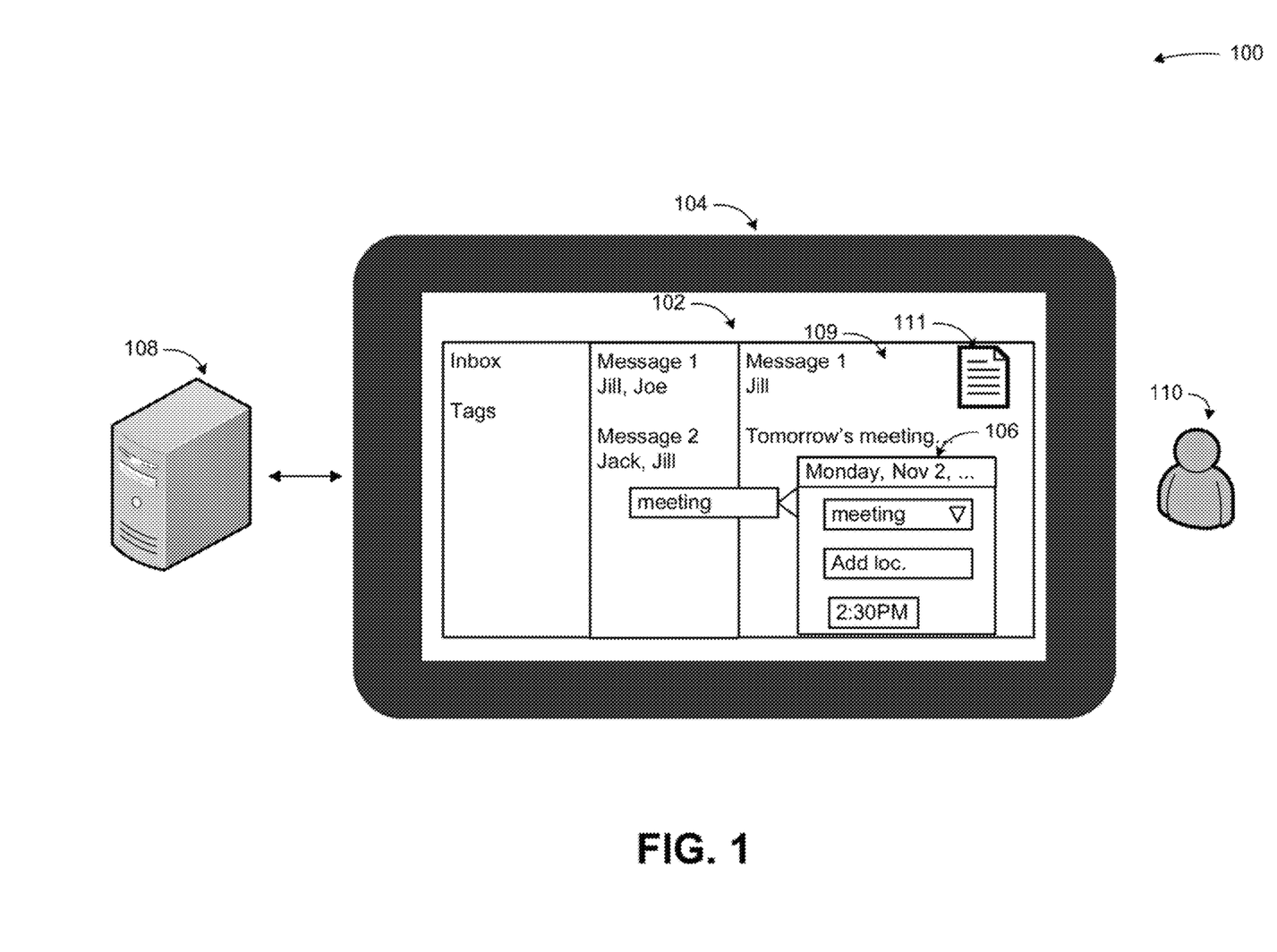
FIG. 1 is a conceptual diagram illustrating an example of providing calendar utility to capture a calendar event, according to embodiments.

FIG. 1 is a conceptual diagram illustrating an example of providing a calendar utility to capture a calendar event, according to embodiments.

In a diagram 100, a computing device 104 may execute a communication application 102. Examples of the communication application 102 may include an email processing application, a document processing application, a messaging application, and/or a conferencing application, among others. The computing device 104 may include a tablet device, a laptop computer, a desktop computer, and a smart phone, among others. The computing device 104 may include a special purpose computing device configured to provide communications management through a display component configured to display communications and/or documents, a communication component configured to transmit communications and/or documents, and/or a storage component configured to store communications and/or documents, among other components.

The computing device 104 may display the communication application 102 to a participant 110. The participant 110 may interact with other participants through a communication 109. Alternatively, the communication application 102 may present a document (or a section of the document) to the participant 110. The participant 110 may be allowed to interact with the communication application 102 through an input device or touch enabled display component of the computing device 104. The computing device 104 may also include a display device such as the touch enabled display component, and a monitor, among others to provide the communication application 102 to the participant 110.

The communication application 102 may monitor a communication 109 or a document 111 for a calendar information. A content of the communication 109 or the document 11 may be parsed to detect the calendar information which may include a date, a time, a location, and/or a title, among others. A calendar utility may be generated in response to the detected calendar information. The calendar utility may include a title element, a calendar list, a date and time element, and/or a location element, among others. Next, the calendar utility may be displayed to capture the calendar event associated with the communication or the document. Alternatively, the calendar utility may also be displayed in response to a received request to present the calendar utility. The request may be in relation to a section of the communication 109 or the document 111. In such a scenario, the calendar utility may be displayed in proximity to the section of the communication 109 or the document 111.

The communication 109 (or the document 111) may be stored and managed locally within the computing device 104. Alternatively, the communication 109 (or the document 1) may be retrieved from a server 108. The server 108 may include a content server and/or a communication server, among others. The server 108 may also host and manage communications and/or documents. An example of the server 108 may include an email server and/or a document server that provides communications and/or documents to be presented by the communication application 102. Additionally, the computing device 104 may communicate with the server 108 through a network. The network may provide wired or wireless communications between nodes such as the computing device 104, or the server 108, among others.

Alternatively, the server 108 may provide the communication application 102. The computing device may present a client interface of the communication application 102. The server 108 may execute operations to provide a calendar utility to capture a calendar event through the communication application 102.

The participant 110 may interact with the communication application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the communication application 102, embodiments are not limited to these components or system configurations and can be implemented with other system configuration employing fewer or additional components.

Figure 2:
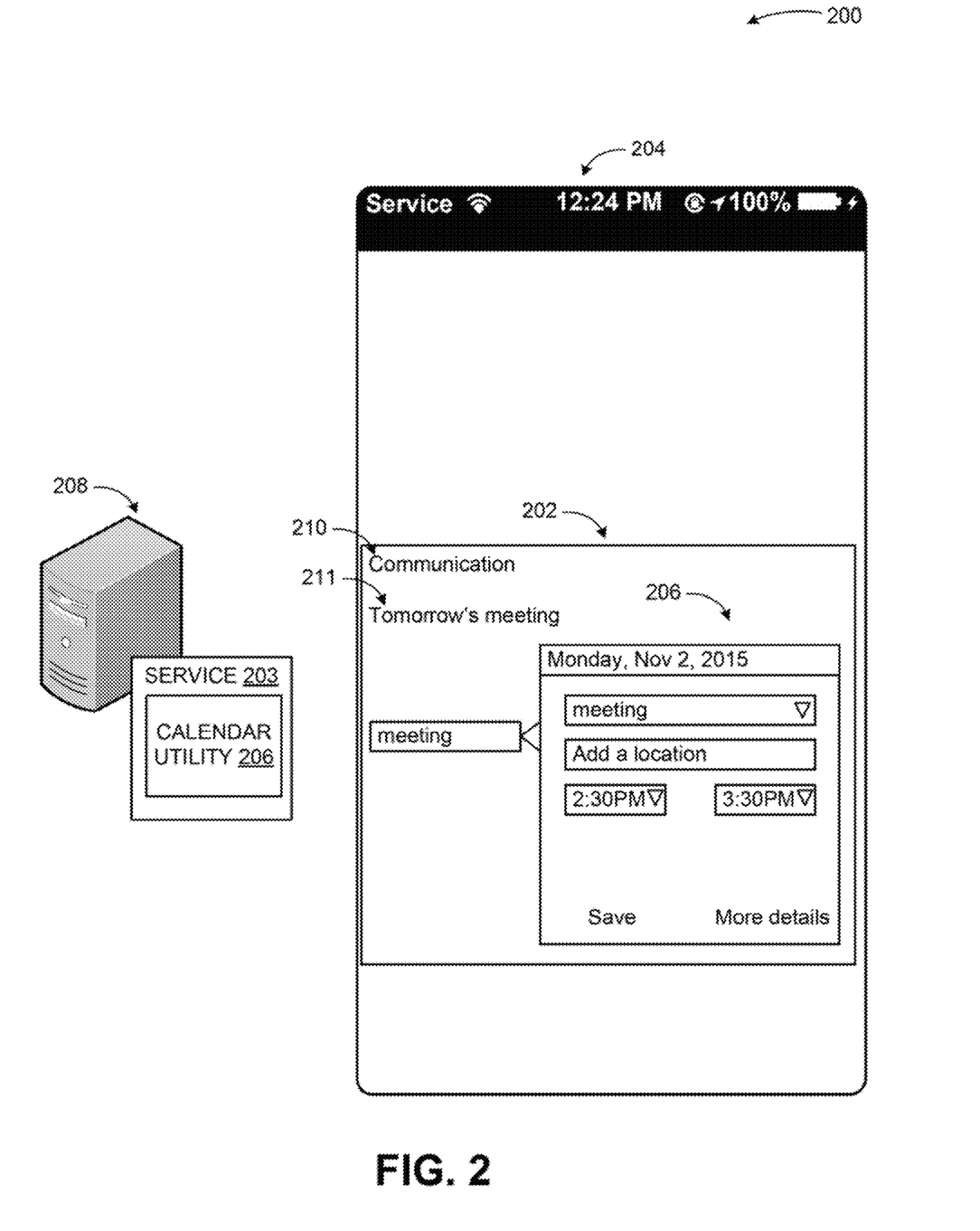
FIG. 2 is a display diagram illustrating an example of a scheme to provide a calendar utility to capture a calendar event, according to embodiments.

FIG. 2 is a display diagram illustrating an example of a scheme to provide a calendar utility to capture a calendar event, according to embodiments.

In a diagram 200, an alternative scheme to provide the calendar utility is illustrated. In an example scenario, a third party provider 208 may host a service 203. The service 203 may provide functionality for consumption by a client device such as a computing device 204. For example, the service 203 may provide a calendar utility 206 that may be displayed by a communication application 202 which is rendered on the computing device 204.

In an example scenario, a calendar module of the communication application 202 may analyze a communication 210 to detect a calendar information 211. The calendar information may include text or other data identified to include a date, a time, a location, and/or a title associated with an item linked to an event. For example, the calendar information may include a text associated with an upcoming event, a reminder, and/or an alarm, among others. The communication 210 (or a document) may be parsed to detect the calendar information by the communication application 202. Alternatively, the communication (or a document) may be transmitted to the service 203 to prompt the third party provider 208 to execute operations to parse the calendar information.

After detecting the calendar information 211, the calendar module may transmit a request for a calendar utility 206 to the service 203. The service 203 may generate the calendar utility 206 which may include a title element, a date and time element, a calendar list, and/or a location element, among others to capture a title entry, a date and time entry, a selection of a calendar, and a location entry. Next, the service 203 may transmit the calendar utility 206 for a presentation by a rendering module of the communication application 202. The rendering module may display the calendar utility 206 in proximity to the calendar information 211 or in another location as specified by the communication application 2012.

Alternatively, the calendar module may transmit the request for the calendar utility 206 in response to an input by a participant to display the calendar utility 206. The input by the participant may be detected in relation to a section of the communication 210 (or a displayed page of a document). In such a scenario, the rendering module may display the calendar utility 206 in proximity to the section of the communication 210 (or the displayed page of the document) or in another location as specified by the communication application 202.

Furthermore, the third party provider 208 may provide the calendar utility 206 through an application programming interface (API). Alternatively, the service 203 may provide the calendar utility 206 an API.

Figure 3:
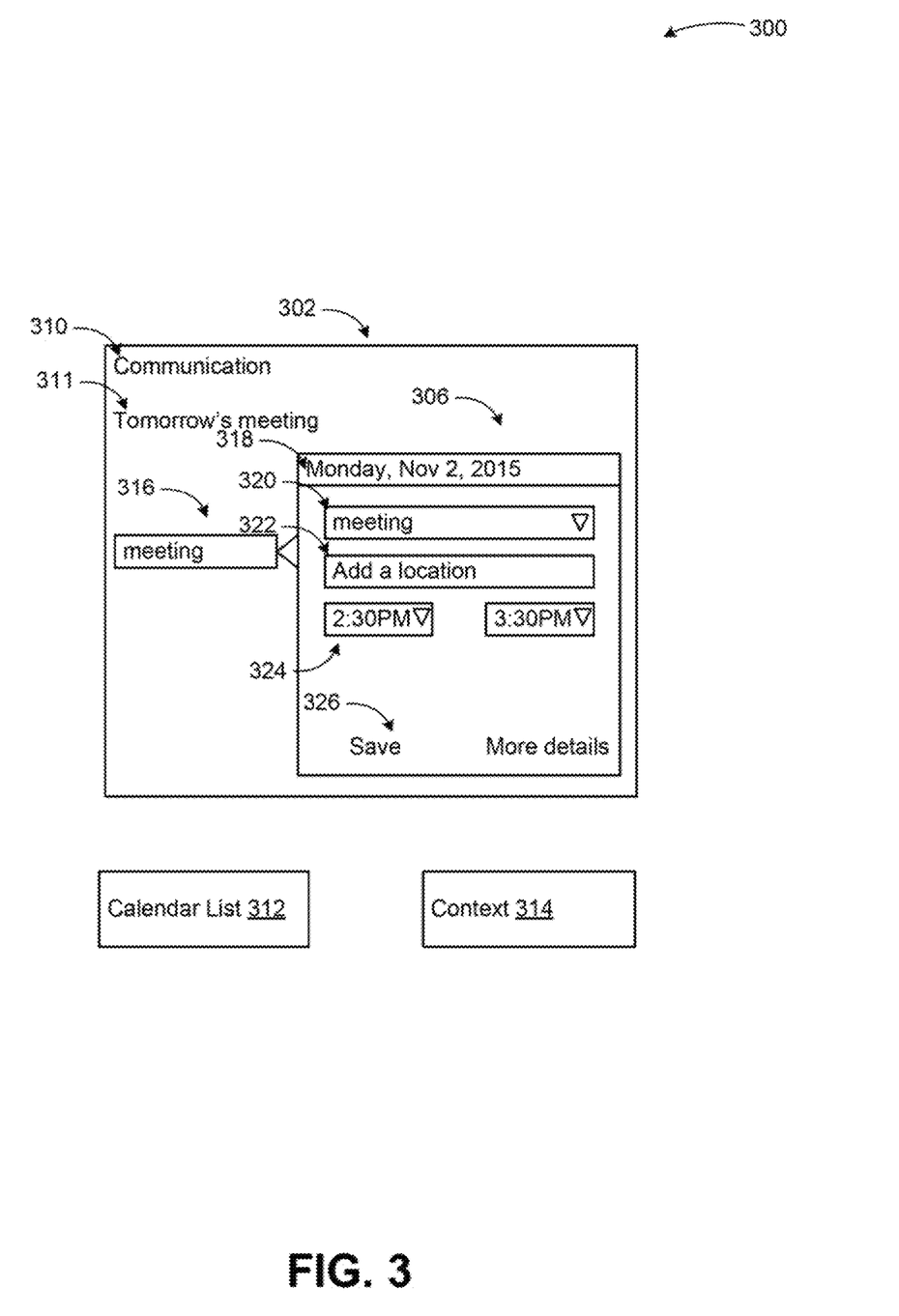
FIG. 3 is a display diagram illustrating an example of a calendar utility, according to embodiments.

FIG. 3 is a display diagram illustrating an example of a calendar utility, according to embodiments.

In a diagram 300, a communication application 302 may provide a calendar utility 306 in response to a detection of a calendar information 311 within a communication 310 or in response to a request for the calendar utility 306 by a participant.

A calendar module of the communication application 302 may generate the calendar utility 306 with a date element 318, a title element 320, a location element 322, and/or a time element 324, among others. In an example scenario, the calendar module may detect an input of a title entry into the title element 320. Next, the calendar module may identify an account associated with a participant presently accessing the communication application 302. External or internal calendar providers may be searched with the account to identify calendars associated with the account. The calendars may be inserted into a calendar list 312. Next, the calendar list 312 may be provided during interactions with the title element 320 to allow the participant to relate the title entry within a selected calendar from the calendar list 312.

The date element 318 and the time element 324 may also be provided to capture a date and time entry associated with the calendar event. Furthermore, the location element 322 may be provided to capture a location associated with the calendar event. The calendar module may use the title entry, the date and time entry, the location entry, and/or a selection of a calendar to create a calendar event. The calendar event may be saved to the calendar selected from the calendar list 312 in response to an action detected on a save element 326.

Moreover, context associated with the participant, the communication 310, and/or a document (presented to the participant) may be used to create the calendar event using the calendar utility 306. For example, the calendar module may identify a context associated with the participant of the communication 310. The context may include a presence information of the participant and a location of the participant. The location of the participant may be used as a default entry to be inserted into the location element 322. For example, a work location of the participant may be used as a default location entry to generate a calendar event with the calendar utility 306.

The presence information of the participant may be used to identify a time period in which the participant may be available at a specific location. The time period may be used as a default date and time entry for insertion into the date element 318 and the time element 324 of the calendar utility 306. Examples of context utilization were not provided in a limiting sense, other context associated with the participant, the communication 310, and/or a document may be used to generate default entry(s) into various elements of the calendar utility 306.

Furthermore, a collapsible element 316 of the calendar utility 306 may also be provided. The collapsible element 316 may be provided to remove an extended section of the calendar utility 306 from a user interface of the communication application 302. A presence of the calendar utility 306 may be maintained through the collapsible element 316. The collapsible element 316 may present a title of the calendar event in the capture process by the calendar utility 306. In response to an action on the collapsible element 316, the calendar utility 306 may be collapsed into the collapsible element 316. While in the collapsed state, in response to another action on the collapsible element 316, the calendar utility 306 may be expanded to an initial size.

Figure 4:
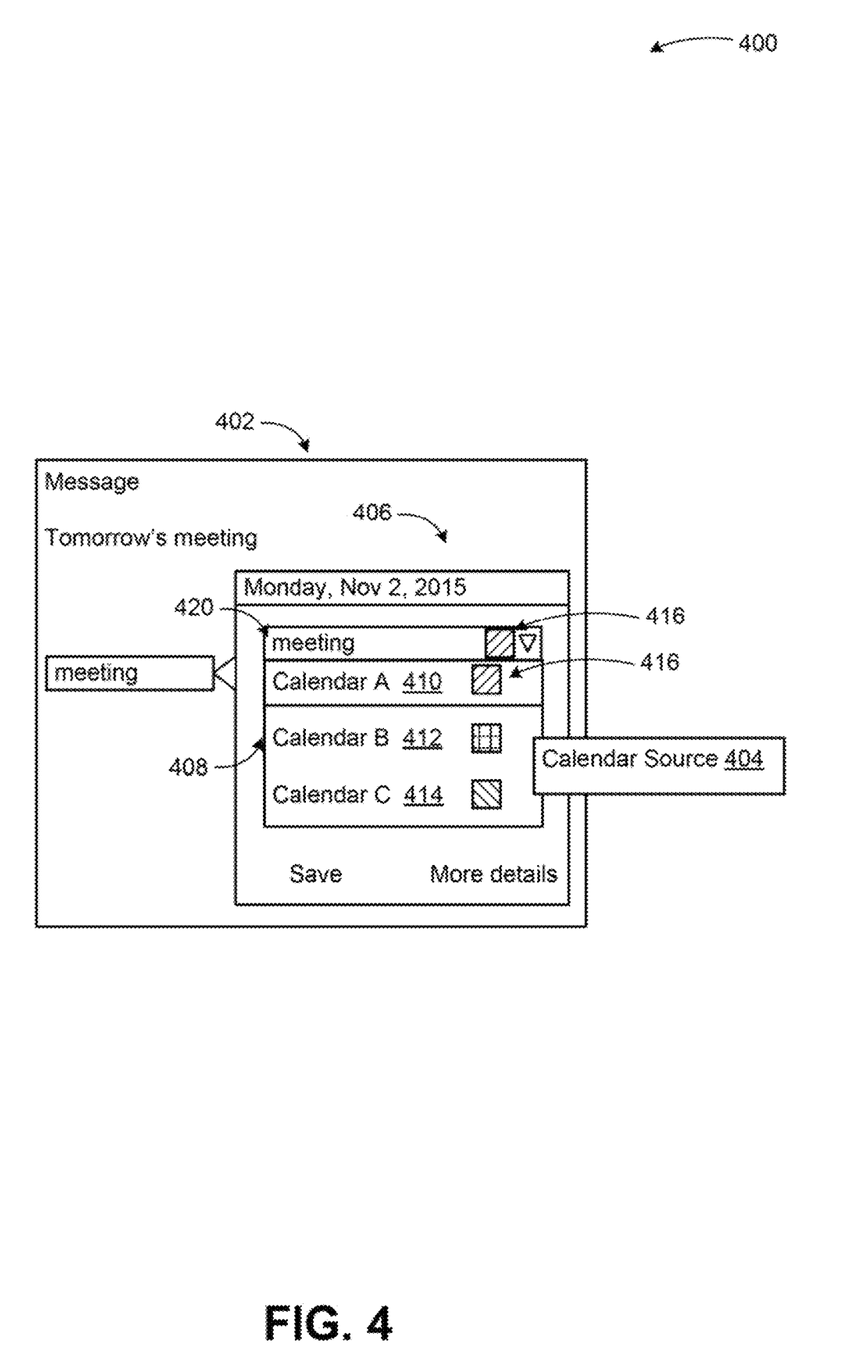
FIG. 4 is a display diagram illustrating another example of a calendar utility, according to embodiments.

FIG. 4 is a display diagram illustrating another example of a calendar utility, according to embodiments.

In a diagram 400, a communication application 402 may present a calendar utility 406 in response to a detected calendar information within a communication or a page of displayed document. The communication application 402 may also present the calendar utility in response to a request by a participant accessing the communication application 402.

A rendering module of the communication application 402 may present a calendar list 408 that is generated by a calendar module of the communication application 402. The calendar list 408 may include calendars (410, 412, and 414). The calendars (410, 412, and 414) may be retrieved from a local and/or an external calendar provider.

The calendar module may format the calendars (410, 412, and 414) with a coloring scheme to differentiate the calendars (410, 412, and 414) with a color such as a color 416. The calendar module may also use other schemes to differentiate the calendars (410, 412, and 414) such as style scheme to vary a style associated with the calendars (410, 412, 414).

A calendar 410 may be selected by the participant to relate the title entry within the title element 420 with the calendar 410. In response to the selection by the participant, a rendering module of the communication application may display the color 416 within the title element 420 to inform of an association of the title entry with the calendar 410.

As discussed above, the application may be employed to perform operations to automate calendar event generation. An increased user efficiency with the communication application 102 may occur as a result of providing a calendar utility to capture a calendar event. Additionally, presenting calendars with a title element for creating a calendar event through a calendar utility rendered by the communication application 102 may reduce processor load, increase processing speed, conserve memory, and reduce network bandwidth usage.

Embodiments, as described herein, address a need that arises from a lack of efficiency between the participant 110 interacting with the communication application 102 of the computing device 104. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing a calendar utility to capture a calendar event may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
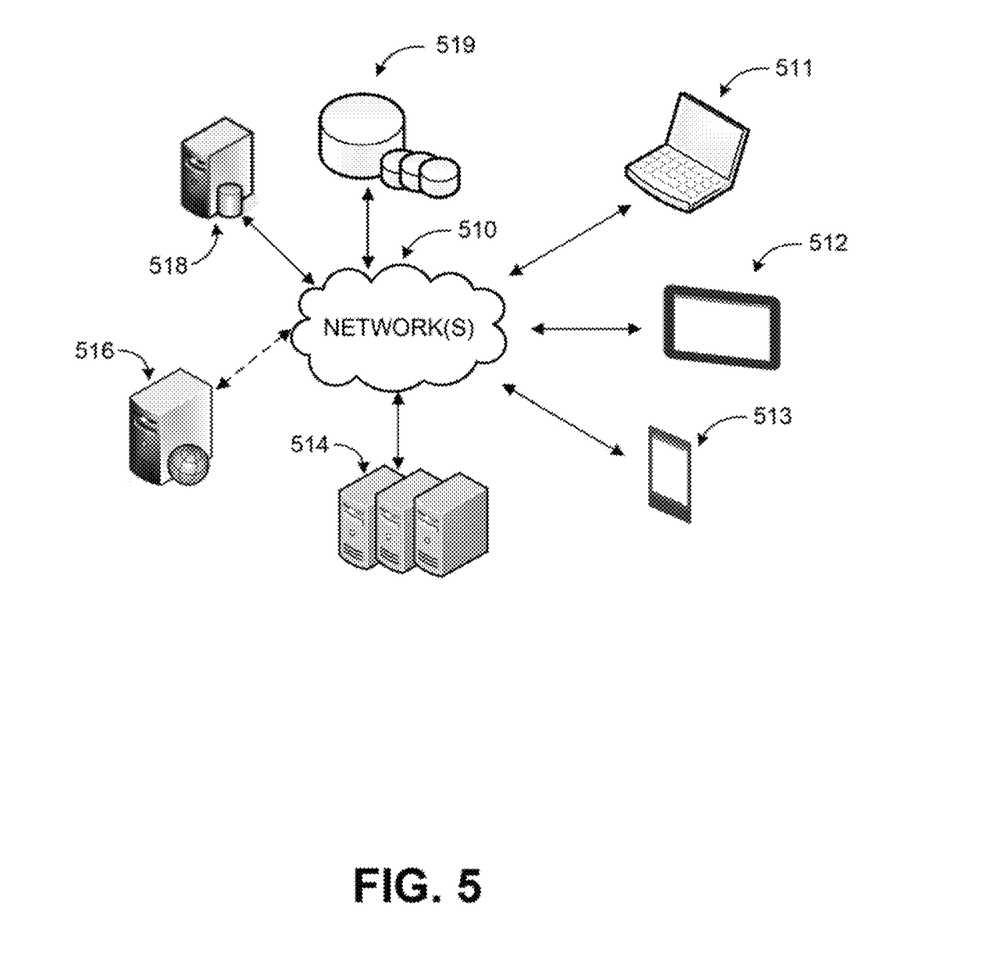
FIG. 5 is a simplified networked environment, where a system according to embodiments may be implemented.

FIG. 5 is an example networked environment, where embodiments may be implemented. A communication application configured to provide a calendar utility to capture a calendar event may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may monitor a communication (or a document) for a calendar information. In response to a detection of the calendar information in the communication (or the document), a calendar utility may be generated. The calendar utility may include a title element, a calendar list, a date and time element, and/or a location element. Next, the calendar utility may be presented to capture the calendar event associated with the communication (or the document). The communication application may store data associated with the calendar event in data store(s) 519 directly or through database server 518.

Network(s) 510 may comprise any topology of servers, clients. Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a calendar utility to capture a calendar event. Furthermore, the networked environments discussed in FIG. 5 are for illustration purposes only. Embodiments are not limited to the example applications, modules, or processes.

Figure 6:
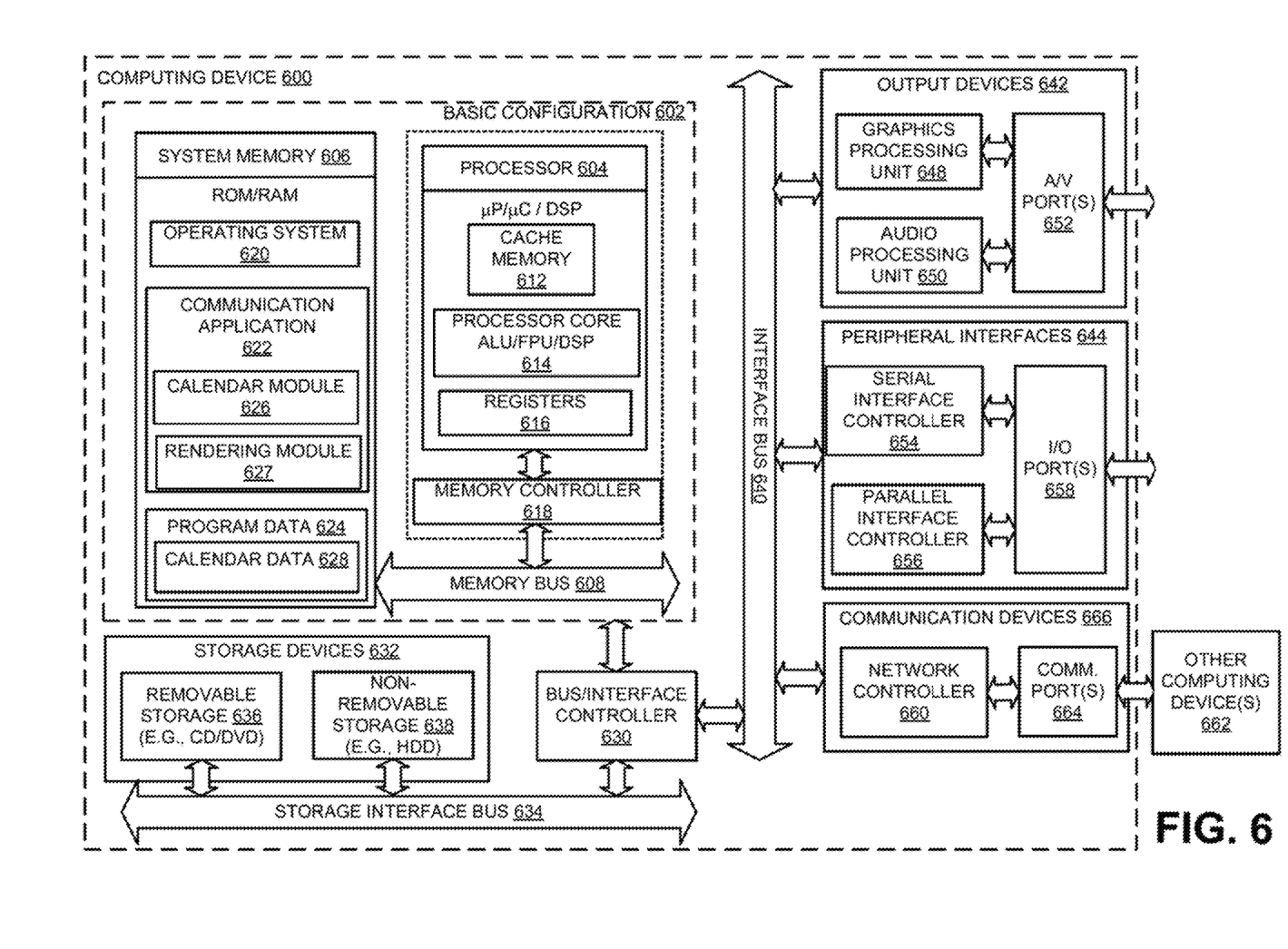
FIG. 6 is a block diagram of an example computing device, which may be used to provide a calendar utility to capture a calendar event, according to embodiments.

FIG. 6 is a block diagram of an example computing device, which may be used to provide a calendar utility to capture a calendar event, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include components such as a calendar module 626 and a rendering module 627. The calendar module 626 and the rendering module 627 may execute the processes associated with the communication application 622. The calendar module 626 may monitor a communication (or a document) for a calendar information. In response to a detection of the calendar information in the communication (or the document), a calendar utility may be generated. The calendar utility may include a title element, a calendar list, a date and time element, and/or a location element. Next, the rendering module 627 may present the calendar utility to capture the calendar event associated with the communication (or the document).

Components of the communication application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the communication application 622, displayed by the touch based device. The program data 624 may also include, among other data, calendar event data 628, or the like, as described herein. The calendar event data 628 may include a date and time, a location, a title, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a calendar utility to capture a calendar event. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
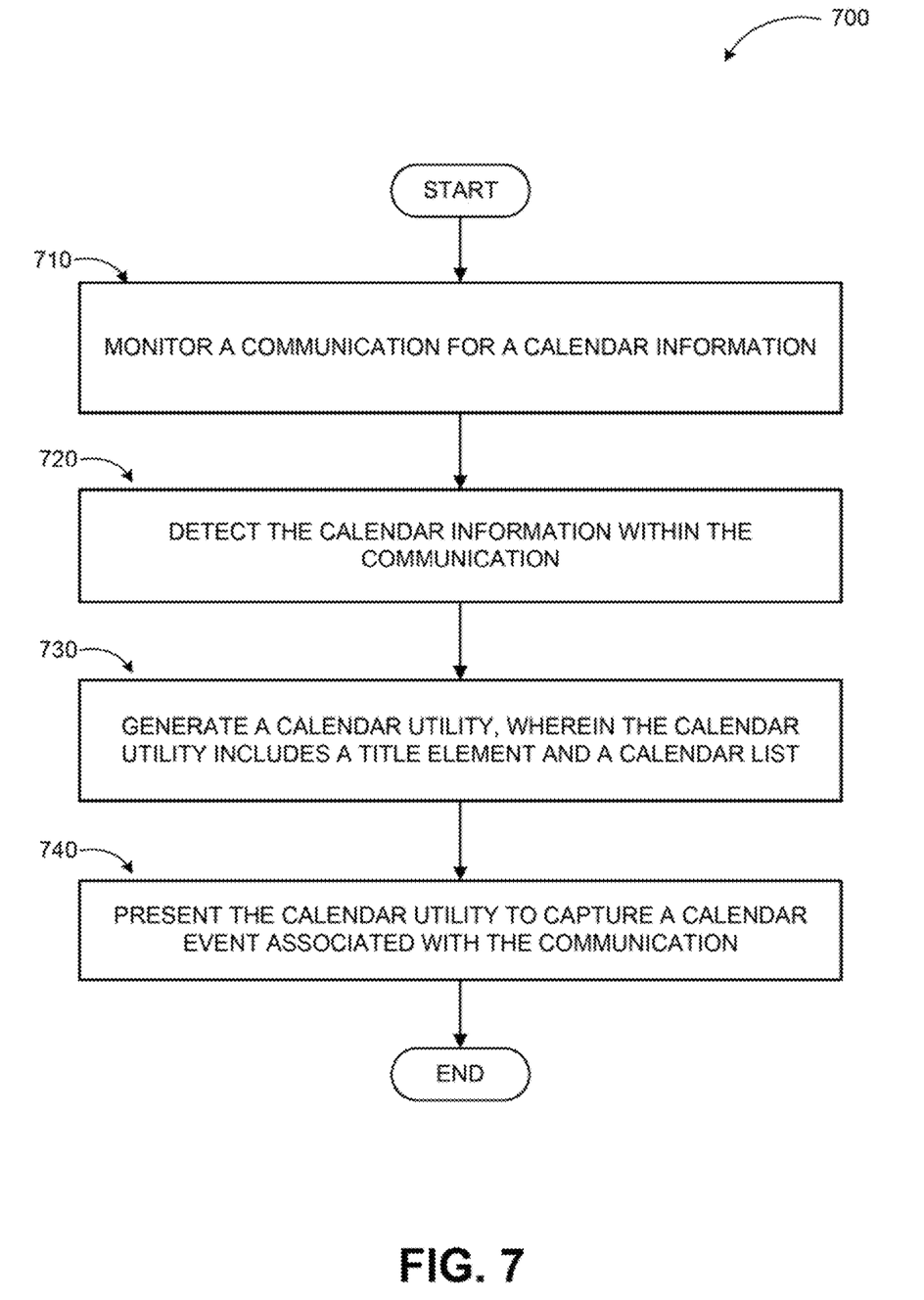
FIG. 7 is a logic flow diagram illustrating a process for providing a calendar utility to capture a calendar event, according to embodiments.

FIG. 7 is a logic flow diagram illustrating a process for providing a calendar utility to capture a calendar event, according to embodiments. Process 700 may be implemented on a computing device, such as the computing device 600 or another system.

Process 700 begins with operation 710, where a communication application may monitor a communication (or a page of a displayed document) for a calendar information. The communication (or the page of the displayed document) may be parsed to identify a date, a time, a location, and/or a title associated with an event. At operation 720, the communication application may detect the calendar information within the communication (or the page of the displayed document). The calendar information may include a date, a time, a location, a title, participant(s), and/or a subject, among others.

At operation 730, the calendar utility may be generated. The calendar utility may include a title element and a calendar list. The calendar list may be a component of the title element that may be presented for a selection of a calendar to relate the title with the selected calendar. The calendar utility may be presented in proximity to the calendar information or another location as specified by the communication application. At operation 740, the calendar utility may be presented to capture a calendar event associated with the communication (or the page of the displayed document).

The operations included in process 700 are for illustration purposes. Providing a calendar utility to capture a calendar event may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device for providing a calendar utility to capture a calendar event is described. The computing device includes a display device, a memory configured to store instructions associated with a communication application, and one or more processors coupled to the memory and the display device. The one or more processors execute the communication application in conjunction with the instructions stored in the memory. The communication application includes a calendar module and a rendering module. The calendar module is configured to monitor a communication for a calendar information, detect the calendar information within the communication, and generate a calendar utility, where the calendar utility includes a title element and a calendar list. The rendering module is configured to present, on the display device, the calendar utility to capture the calendar event associated with the communication.

In other examples, the calendar information includes one or more of a date, a time, a location, a title, and a subject associated with an event. The calendar module is further configured to identify an account associated with a participant, query a calendar source to identify one or more calendars associated with the account, receive the one or more calendars from the calendar source, and insert the one or more calendars into the calendar list. The calendar source includes one or more of: a local source and an external source.

In further examples, the calendar module is further configured to include a location element within the calendar utility to capture a location associated with the calendar event. The calendar module is further configured to include a date and time element within the calendar utility to capture a time of the calendar event. The rendering module is further configured to detect a title entry into the title element, detect a selection of a calendar from the calendar list, detect a location entry into a location element and a date and time entry into a date and time element, detect a save action, and provide, on the display device, the title entry, the calendar, the location entry, and the date and time entry to the calendar module. The calendar module is further configured to generate the calendar event from the title entry, the location entry and the date and time entry, save the calendar event to the calendar.

In other examples, the rendering module is further configured to display, on the display device, a page of a document and provide the page to the calendar module. The calendar module is further configured to parse the page to detect another calendar information, detect the other calendar information, and provide the calendar utility to the rendering module for a presentation in proximity to the other calendar information to capture another calendar event associated with the page. The calendar module is further configured to format one or more calendars within the calendar list with a coloring scheme, where the coloring scheme differentiates the one or more calendars.

In some examples, a method executed on a computing device for providing a calendar utility to capture a calendar event is described. The method includes monitoring a communication for a calendar information, detecting the calendar information within the communication, generating a calendar utility, where the calendar utility includes a title element, a calendar list, a location element, and a date and time element, and presenting the calendar utility to capture the calendar event associated with the communication.

In other examples, the method further includes detecting a request to display the calendar utility in proximity to a section of the communication and displaying the calendar utility in proximity to the section of the communication to capture the calendar event associated with the section of the communication. The method further includes identifying a context associated with a participant of the communication, where the context includes a presence status of the participant and a location of the participant. The method further includes inserting the location of the participant as a default entry into a location element of the calendar utility. The method further includes identifying a date and time associated with the presence status of the participant, where the presence status of the participant is available at the date and time and inserting the date and time as a default entry into a date and time element of the calendar utility. The method further includes presenting a collapsible element in proximity to the calendar utility, where the collapsible element displays a title captured on the title element, detecting a collapse action on the calendar utility, and collapsing the calendar utility into the collapsible element.

In some examples, a computer-readable memory device with instructions stored thereon for providing a calendar utility to capture a calendar event is described. The instructions includes actions that are similar to the actions of the method.

In some examples, a means for providing a calendar utility to capture a calendar event is described. The means for providing a calendar utility to capture a calendar event includes a means for monitoring a communication for a calendar information, a means for detecting the calendar information within the communication, a means for generating a calendar utility, where the calendar utility includes a title element and a calendar list, and a means for presenting the calendar utility to capture the calendar event associated with the communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:
1. A computing device comprising:
a memory configured to store instructions associated with a messaging or mail application;
one or more processors coupled to the memory, the one or more processors being configured to execute the messaging or mail application in conjunction with the instructions stored in the memory, which causes the one or more processors to:
receive communications from an email server via the messaging or mail application and cause display of the communications on a first user interface of the messaging or mail application;
monitor the communications associated with a user for at least one calendar event;
automatically parse the communications of the messaging or mail application and
detect a calendar date or text related to the calendar event in the parsed communications;

in response to the detected calendar date or the text related to the calendar event in the parsed communications:
  generate an upcoming calendar event that has a scheduled start date that corresponds to the detected calendar date or the detected text related to the calendar event, and a title element corresponding to text information adjacent to the detected calendar date or the detected text related to the calendar event;
  identify a user account presently accessing the messaging or mail application;
  search each of a plurality of external and internal electronic calendar sources for other user accounts corresponding to the identified user account to identify at least two electronic calendars associated with the identified user account; and
  cause display of a second user interface of the messaging or mail application, the second user interface displaying the title element, the calendar date of the generated upcoming calendar event and a list that includes the at least two identified electronic calendars associated with the identified user account;
  receive, via the second user interface, a user selection of at least one of the at least two identified electronic calendars associated with the identified user account; and
  based on receiving a specific user input into the second user interface after the user selection, transmit the upcoming calendar event to be saved by each of the at least one of the at least two identified electronic calendars that were selected.

2. The computing device of claim 1, wherein the upcoming calendar event includes one or more of: a time, a location, and a subject associated with the upcoming calendar event.

3. The computing device of claim 1, wherein the at least two electronic calendars include one or more of: a local source and an external source.

4. The computing device of claim 1, wherein the second user interface includes a location element to capture a location associated with the generated upcoming calendar event.

5. The computing device of claim 1, wherein the second user interface includes a time element to capture a time of the generated upcoming calendar event.

6. The computing device of claim 1, wherein the one or more processors are further configured to:
  detect a title entry into the title element in the second user interface;
  detect a location entry into a location element included in the second user interface and a date and time entry into a date and time element included in the second user interface;
  detect a save action; and
  cause display, on the second user interface, of the title entry, a calendar, the location entry, and the date and time entry.

7. The computing device of claim 6, wherein the one or more processors are further configured to cause the upcoming calendar event to be saved by each of the at least one identified electronic calendar that was selected from the list of calendars based on the entries entered into the second user interface by generating the upcoming calendar event from the title entry, the location entry and the date and time entry, and saving the generated upcoming calendar event to each of the two or more identified electronic calendars that were selected.

8. The computing device of claim 1, wherein the one or more processors are further configured to:
  cause display, on the second user interface, of a page of a document.

9. The computing device of claim 8, wherein the one or more processors are further configured to:
  parse the page to detect other calendar information; and
  cause display of the second user interface within the messaging or mail application at a position in proximity to the calendar information to capture another upcoming calendar event associated with the page.

10. The computing device of claim 1, wherein the one or more processors are further configured to:
  format one or more of the at least two identified electronic calendars within the list with a coloring scheme, wherein the coloring scheme differentiates the one or more of the at least two identified electronic calendars.

11. A method executed by a hardware processor, the method comprising:
  retrieving, by the processor, communications, from an email server via a messaging or mail application and displaying the communications on a first user interface of the messaging or mail application;
  monitoring, by the processor, the communications associated with a user for at least one calendar event;
  automatically parsing, by the processor, the communications of the messaging or mail application and detecting a calendar date or text related to the calendar event in the parsed communications;
  in response to the detected calendar date or the text related to the calendar evet in the parsed communications;
    generating, by the processor, a upcoming calendar event that has a scheduled start date that corresponds to the detected calendar date or the detected text related to the calendar event, and a title element corresponding to text information adjacent to the detected calendar date or the detected text related to the calendar event;
  identifying, by the processor, a user account presently accessing the messaging or mail application;
  searching, the processor, each of a plurality of external and internal electronic calendar sources for other user accounts corresponding to the identified user account to identify at least two electronic calendars associated with the identified user account; and
  causing display, by the processor, of a second user interface of the messaging or mail application, the second user interface displaying the title element, the calendar date of the generated upcoming calendar event and a list that includes the at least two identified electronic calendars associated with the identified user account;
  receiving, by the processor via the second user interface, a user selection of at least one of the at least two identified electronic calendars associated with the identified user account; and
  based on receiving a specific user input into the second user interface after the user selection, transmitting, by the processor, the upcoming calendar event to be saved by each of the at least one of the at least two identified electronic calendars that were selected.

12. The method of claim 11, further comprising:
  detecting, by the processor, a request to display the second user interface in proximity to a section of the communications; and causing display, by the processor, of the second user interlace within the messaging or mail calendar application at a position in proximity to the section of the communications to capture the upcoming calendar event associated with the section of the communications.

13. The method of claim 11, further comprising: identifying, by the processor, a context associated with a participant of the communications, wherein the context includes a presence status of the participant and a location of the participant.

14. The method of claim 13, further comprising: inserting, by the processor, the location of the participant as a default entry into a location element of the second user interface.

15. The method of claim 13, further comprising:
identifying, by the processor, a date and time associated with the presence status of the participant, wherein the presence status of the participant is available at the identified date and time; and
inserting, by the processor, the date and time as a default entry into a date and time element of the second user interface.

16. The method of claim 11, further comprising:
causing display, by the processor, of a collapsible element in proximity to the second user interface, wherein the collapsible element displays a title captured on the title element;
detecting, by the processor, a collapse action on the second user interface; and
collapsing, by the processor, the second user interface into the collapsible element.

17. A non-transitory computer-readable medium comprising computer-executable instructions that, when executed by a processor, cause the processor to:
retrieve communications from an email server via a messaging or mail application and displaying the communications on a first user interface of the messaging or mail application;
monitor the communications associated with a user for at least one calendar event;
automatically parse the communications of the messaging or mail application and detect a calendar date or text related to the calendar event in the parsed communications;
in response to the detected calendar date or the text related to the calendar event in the parsed communications:
generate an upcoming calendar event that has a scheduled start date that corresponds to the detected calendar date or the detected text related to the calendar event, and a title element corresponding to text information adjacent to the detected calendar date or the detected text related to the calendar event;
identify a user account presently accessing the messaging or mail application;
search each of a plurality of external and internal electronic calendar sources for other user accounts corresponding to the identified user account to identify at least two electronic calendars associated with the identified user account; and
cause display of a second user interface of the messaging or mail application, the second user interface displaying the title element, the calendar date of the generated upcoming calendar event and a list that includes the at least two identified electronic calendars associated with the identified user account;
receive, via, the second user interface, a user selection of at least one of the at least two identified electronic calendars associated with the identified user account; and
based on receiving a specific user input into the second user interface after the user selection, transmit the upcoming calendar event to be saved by each of the at least one of the at least two identified electronic calendars that were selected.

18. The non-transitory computer-readable medium of claim 17, wherein the computer-executable instructions are further configured to cause the processor to:
detect a title entry into the title element, a location entry into a location element, and a date and time entry into a date and time element; and
detect a save action, wherein the computer-executable instructions are further configured to cause the processor to:
transmit the upcoming calendar event to be saved by each of the two or more identified electronic calendars that were selected by generating the upcoming calendar event from the detected title entry, the detected location entry and the detected date and time entry; and
controlling the network communication interface to cause the upcoming calendar event to be saved by each of the two or more identified electronic calendars that were saved.

19. The non-transitory computer-readable medium of claim 18, wherein the computer-executable instructions are further configured to cause the processor to:
cause display of a collapsible element in proximity to the second user interface, wherein the collapsible element displays a title captured on the title element;
detect a collapse action on the second user interface; and
collapse the second user interface into the collapsible element by removing the title element, the list, the location element, and the date and time element.

* * * * *